3,079,305
PROCESS FOR THE ENZYMATIC ACYLATION OF 6-AMINOPENICILLANIC ACID
Wilfried Kaufmann, Wuppertal-Vohwinkel, and Klaus Bauer and Hans Albert Offe, Wuppertal-Elberfeld, Germany, assignors to Farbenfabriken Bayer Aktiengesellschaft, Leverkusen, Germany, a corporation of Germany
No Drawing. Filed Sept. 9, 1960, Ser. No. 54,837
Claims priority, application Germany Sept. 24, 1959
8 Claims. (Cl. 195—36)

In copending United States Application Serial No. 22,086, which was filed on April 14, 1960, and is entitled "Biochemical Process," there is described and claimed a unique, biosynthesis in which certain so-called "penicillin-splitting" bacteria or suspensions or extracts of the same, that is, bacteria capable of preferentially attacking the amide bond in the 6-position of a penicillin molecule, are caused to act on penicillins to effect their enzymatic hydrolysis with the production of 6-aminopenicillanic acid and phenylacetic acid. The enzymatic reaction as described in said copending application is effected within a pH range between 5.5 and 8.0.

It has now been found that at pH values below 5.5 and in the presence of carboxylic acids, their salts or derivatives, bacteria are capable of linking the 6-positioned amino group of 6-aminopenicillinic acid amide-like with the said carboxylic acids with the release of water. In this way there are formed 6-acylaminopenicillanic acids, that is to say compounds having the constitution of penicillins.

It is known that penicillin-forming living fungi such as *Penicillium chrysogenum*, are capable of using phenylacetic acid added to the nutrient solution for building up penicillin. On the other hand, numerous species of bacteria are known to be at best capable of inactivating penicillin. It was the more surprising to find bacteria which are able in the living or dead, but enzymatically active state to form 6-acylaminopenicillanic acids from 6-aminopenicillanic acid and carboxylic acids.

It has been found that for this synthesis of 6-acylaminopenicillanic acids those bacteria are suitable which are capable of enzymatically synthesizing penicillin G from penylacetic acid and 6-aminopenicillanic acid. Suitable bacteria are easily selected by bringing a 1% aqueous solution of potassium-phenylacetate containing 0.025% of 6-aminopenicillanic acid to pH 4 and treating it with a suspension of the bacteria to be tested. If after an incubation time of 2 hours at 37° C., 1 cc. of solution contains more than 10 penicillin G units, the bacteria are suitable for this synthesis.

Those bacteria are chiefly suitable for the synthesis which at higher pH values attack the amide bond in the 6-position of the penicillin molecule with the formation of 6-aminopenicillanic acid. The process may therefore also be carried out by using the same bacteria first for splitting off 6-aminopenicillanic acid from penicillin and then for acylating the 6-aminopenicillanic acid.

The synthesizing activity of certain of the bacteria can be increased, similar to the bacteria utlized in the production of 6-aminopenicillanic acid, by initially cultivating these bacteria according to the process described and claimed in copending United States application Serial No. 54,838, which was filed on September 9, 1960, and is entitled "Process for the Production of Penicillin-Splitting Enzyme Preparations," while aerating the bacteria in nutrient solutions preferably containing corn steep liquor which contains negligible quantities of hydrocarbons and small quantities of organic acids and to which 0.002 to 2% of phenylacetic acid or its derivatives have been added carbon dioxide being introduced during the growth, if so desired.

Numerous 6-acyl derivatives of 6-aminopenicillanic acid can be produced with the aid of these bacteria by adding the corresponding carboxylic acids, their salts or derivatives to the reaction mixture. Very suitable as derivatives are the N-substituted amides of these carboxylic acids, especially such amides which carry a carboxyalkyl residue as a substituent, f. i. the acylglycocoll and acyl glutaminic acid derivatives of the corresponding carboxylic acids. The syntheses are expediently carried out at pH values between 4.0 and 5.5, preferably at pH 4.5, in the presence of toluene, chloroform or other preserving agents conventionally used for enzymic operations. The reaction temperature may amount to 10–45° C., but it is advantageous to work at 37° C.

The carboxylic acids used for acylation of 6-aminopenicillanic acid should be present in the reaction mixture as dilute solutions at concentrations of, for example, 0.1–10%. Their quantity should exceed the amount required for a quantitative acylation of the 6-aminopenicillanic acid employed.

For the rest, the concentrations of the reaction components may be arbitrarily varied.

The resulting 6-acylaminopenicillanic acids are obtainable from the reaction mixtures by the conventional methods of isolating penicillins.

According to the method described in Examples 1–14 some additional carboxylic acid derivatives have been tested with respect to their acylating capacity in the presence of the enzyme. The following table gives the results. The column "units/ccm." shows the penicillin activity, measured with a penicillin-G standard in the plate test against *Bact. subtilis* ATCC 6633.

| Concentration of the acylating carboxylic acid derivatives | Concentration of the 6-aminopenicillanic acid, percent | pH | Action of the enzym at 37° C., minutes | Units/ccm. |
| --- | --- | --- | --- | --- |
| 1.0% phenyl acetyl glycocoll | 0.025 | 4.5 | 45 | 507 |
| 2.0% phenyl acetyl glycocoll | 0.25 | 4.5 | 60 | 5,658 |
| 1.0% phenyl acetyl glutaminic acid | 0.025 | 4.5 | 25 | 387 |
| 1.0% phenyl acetyl asparagin | 0.025 | 4.5 | 40 | 424 |
| 1.0% phenyl acetyl alanin | 0.025 | 4.5 | 40 | 424 |
| 1.0% phenyl acetyl leucin | 0.025 | 4.5 | 40 | 252 |
| 0.25% phenyl acetyl glycocoll | 0.025 | 5.8 | 40 | 204 |
| 1.0% p-nitrophenyl acetyl glycocoll | 0.025 | 5.0 | 45 | 190 |
| 1.0% p-aminophenyl acetyl glycocoll | 0.025 | 5.0 | 45 | 492 |
| 1.0% p-aminophenyl acetyl glycocoll | 0.125 | 5.0 | 45 | 2,142 |

The following examples are given for the purpose of illustrating the invention.

*Example 1*

160 litres of a 2% by volume of corn steep liquor solution containing 0.2% of potassiumphenylacetate are adjusted to pH 7 by means of potassium hydroxide and heated to 120° C. for 30 minutes. After cooling, the solution is clarified by centrifuging and sterilised at 110° in a fermenter for 40 minutes. After cooling, this nutrient solution is inoculated with 400 c. of an 18 hours' shaking culture of *E. coli* ATCC 11, 105. The mixture is then aired with 150 litres of air per minute at 150 r.p.m. of the stirrer and cultivated at 31° C. without high pressure for 17 hours. During the whole growth period 5 litres of carbon dioxide per minute are introduced into the culture through a feed which is separated from the air feed of fermenter. The bacterial cells are centrifuged off from the culture solution, washed with 16 litres of a 1/15 m. phosphate buffer solution of pH 6.0 and, after centrifuging, resuspended in a 1/15 m. phosphate buffer solution of pH 6.0 to form the thick suspension there are added 0.025% of 6-aminopenicillanic acid, 1.0% of potassiumphenylacetate and 0.2% of toluene. The reaction mixture is then adjusted to pH 4.5 with hydrochloric acid and stored at 37° C. 2 hours. After this time, the mixture contains 420 I.U. of penicillin G per cc.

*Example 2*

The reaction mixture of Example 1 contains the potassium salt of p-nitrophenylacetic acid instead of postassium phenylacetate. The reaction mixture is further treated as described in Example 1. The enzymatic reaction yields p-nitrophenyl-acetylaminopenicillanic acid.

*Example 3*

Instead of potassium phenylacetate, the reaction mixture of Example 1 contains the sodium salt of p-aminophenyl-acetic acid. The reaction mixture is further treated as described in Example 1. The enzymatic reaction yields p-aminophenyl-acetylamino-penicillanic acid which shows the spectrum of antibacterial activity described in Biochem. Journ. 69, 478 (1959).

*Example 4*

Instead of potassium phenylacetate, the reaction mixture of Example 1 contains the potassium salt of p-chlorophenyl-acetic acid. The reaction mixture is further treated as described in Example 1. The enzymatic reaction yields p-chlorophenyl-acetylamino-penicillanic acid.

*Example 5*

Instead of potassium phenylacetate, the reaction mixture of Example 1 contains the potassium salt of o-chlorophenylacetic acid. The reaction mixture is further treated as described in Example 1. The enzymatic reaction yields o-chlorophenyl-acetylamino-penicillanic acid.

*Example 6*

Instead of potassium phenylacetate, the reaction mixture of Example 1 contains the sodium salt of m-chlorophenyl-acetic acid. The reaction mixture is further treated as described in Example 1. The enzymatic reaction yields m-chlorophenyl-acetylamino-penicillanic acid.

*Example 7*

Instead of potassium phenylacetate, the reaction mixture of Example 1 contains the potassium salt of 3,4-dichlorophenyl-acetic acid. The reaction mixture is further treated as described in Example 1. The enzymatic reaction yields 3,4 - dichlorophenyl-acetylamino - penicillanic acid.

*Example 8*

Instead of potassium phenylacetate, the reaction mixture of Example 1 contains the potassium salt of p-nitrophenylethyl-acetic acid. The reaction mixture is further treated as described in Example 1. The enzymatic reaction yields p-nitrophenylethyl - acetylamino - penicillanic acid.

*Example 9*

Instead of potassium phenylacetate, the reaction mixture of Example 1 contains the potassium salt of phenoxyacetic acid. The reaction mixture is further treated as described in Example 1. The enzymatic reaction yields phenoxyacetylamino-penicillanic acid showing the antibacterial activity spectrum characteristic of penicillin V.

*Example 10*

Instead of potassium phenylacetate, the reaction mixture of Example 1 contains the sodium salt of n-valerianic acid. The reaction mixture is further treated as described in Example 1. The enzymatic reaction yields n-valeroyl-amino-penicillanic acid.

*Example 11*

Instead of potassium phenylacetate, the reaction mixture of Example 1 contains the sodium salt of n-caproic acid. The reaction mixture is further treated as described in Example 1. The enzymatic reaction yields N-caproyl-amino-penicillanic acid.

*Example 12*

Instead of potassium phenylacetate, the reaction mixture of Example 1 contains the sodium salt of n-caprylic acid. The reaction mixture is further treated as described in Example 1. The enzymatic reaction yields n-capryloyl-amino-penicillanic acid.

*Example 13*

Instead of potassium phenylacetate, the reaction mixture of Example 1 contains the potassium salt of isocaproic acid. The reaction mixture is further treated as described in Example 1. The enzymatic reaction yields isocaproylamino-penicillanic acid.

*Example 14*

Instead of potassium phenylacetate, the reaction mixture of Example 1 contains the sodium salt of ethylmercaptoacetic acid. The reaction mixture is further treated as described in Example 1. The enzymatic reaction yields ethylmercapto-acetylamino-penicillanic acid.

We claim:

1. Process for the production of a 6-acylaminopenicillanic acid, that comprises cultivating in a nutrient medium under approximately aerobic conditions at an approximately neutral pH, a culture of *Escherichia coli*; separating the bacterial cells from the culture solution and suspending said cells in an aqueous medium; adding thereto 6-aminopenicillanic acid and a carboxylic acid derivative containing an acyl radical of the general formula:

$$R—(X)_n—CH_2—CO—$$

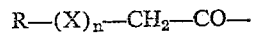

wherein R is a member selected from the group consisting of lower alkyl radicals containing from 1 to 7 carbon atoms, and phenyl radicals; X is a member selected from the group consisting of oxygen and sulfur; and $n$ is an integer of from 0 to 1, inclusive; said *Escherichia coli* functioning to link the 6-amino group of said 6-aminopenicillanic acid with said acyl radical; adjusting the pH value to between 4.0 and 5.5; incubating the resulting reaction mixture for at least two (2) hours and thereafter recovering the 6-acylaminopenicillanic acid from the reaction mixture.

2. Process for the production of a 6-acylaminopenicillanic acid, that comprises cultivating in a nutrient medium under aerobic conditions at an approximately neutral pH, a culture of *Escherichia coli* (ATCC 11, 105); separating the bacterial cells from the culture solution and suspending said cells in an aqueous medium; adding thereto penicillin G and a carboxylic acid derivative containing an acyl radical of the general formula:

$$R—(X)_n—CH_2—CO—$$

wherein R is a member selected from the group consisting of lower alkyl radicals containing from 1 to 7 carbon atoms, and phenyl radicals; X is a member selected from the group consisting of oxygen and sulfur; and $n$ is an integer of from 0 to 1, inclusive; said *Escherichia coli* functioning to split the amide bond in the 6-position of said penicillin molecule with the formation of 6-aminopenicillanic acid and further functioning to link the 6-amino group of said 6-aminopenicillanic acid with said acyl radical; adjusting the pH value to between 4.0 and 5.5; incubating the resulting reaction mixture for at least two (2) hours and thereafter recovering the 6-acylaminopenicillanic acid from the reaction mixture.

3. Process for the production of a 6-acyl aminopenicillanic acid, that comprises cultivating in a corn steep liquor solution under aerobic conditions at a pH of about 7, a culture of *Escherichia coli*, separating the bacterial cells from the culture solution and suspending said cells in an aqueous medium at a pH of about 6, adding thereto 6-aminopenicillanic acid and the potassium salt of p-nitropenyl acetic acid, adjusting the resulting reaction mixture to a pH of about 4.5, incubating said reaction mixture at about 37° C. for at least 2 hours, and thereafter recovering p-nitrophenyl acetyl aminopenicillanic acid from the reaction mixture.

4. Process for the production of a 6-acyl aminopenicillanic acid, that comprises cultivating in a corn steep liquor solution under aerobic conditions at a pH of about 7, a culture of *Escherichia coli*, separating the bacterial cells from the culture solution and suspending said cells in an aqueous medium at a pH of about 6, adding thereto 6-aminopenicillanic acid and the sodium salt of p-aminophenyl acetic acid, adjusting the resulting reaction mixture to a pH of about 4.5, incubating the reaction mixture at about 37° C. for at least 2 hours, and thereafter recovering p-aminophenyl acyl aminopenicillanic acid from the reaction mixture.

5. Process for the production of a 6-acyl aminopenicillanic acid, that comprises cultivating in a corn steep liquor solution under aerobic conditions at a pH of about 7, a culture of *Escherichia coli*, separating the bacterial cells from the culture solution and suspending said cells in an aqueous medium at a pH of about 6, adding thereto 6-aminopenicillanic acid and the potassium salt of chlorophenyl acetic acid, adjusting the resulting reaction mixture to a pH of about 4.5, incubating said reaction mixture at about 37° C. for at least 2 hours, and thereafter recovering chlorophenyl acetyl aminopenicillanic acid from said reaction mixture.

6. Process for the production of a 6-acyl aminopenicillanic acid, that comprises cultivating in a corn steep liquor solution under aerobic conditions at a pH of about 7, a culture of *Escherichia coli*, separating the bacterial cells from the culture solution and suspending said cells in an aqueous medium at a pH of about 6, adding thereto 6-aminopenicillanic acid and the potassium salt of nitrophenyl ethyl acetic acid, adjusting the resulting reaction mixture to a pH of about 4.5, incubating said reaction mixture at about 37° C. for at least 2 hours, and thereafter recovering nitrophenyl ethyl acetyl aminopenicillanic acid from said reaction mixture.

7. Process for the production of a 6-acyl aminopenicillanic acid, that comprises cultivating in a corn steep liquor solution under aerobic conditions at a pH of about 7, a culture of *Escherichia coli*, separating the bacterial cells from the culture solution and suspending said cells in an aqueous medium at a pH of about 6, adding thereto 6-aminopenicillanic acid and the sodium salt of n-caproic acid, adjusting the resulting reaction mixture to a pH of about 4.5, incubating said reaction mixture at about 37° C. for at least 2 hours, and thereafter recovering n-caproyl aminopenicillanic acid from said reaction mixture.

8. Process for the production of a 6-acylaminopenicillanic acid that comprises:
cultivating in a nutrient medium under aerobic conditions at an approximately neutral pH, a culture of a penicillin-splitting bacteria;
separating the bacterial cells from the culture solution and suspending said cells in an aqueous medium;
adding thereto 6-aminopenicillanic acid and a carboxylic acid derivative containing an acyl radical of the general formula:

$$R—(X)_n—CH_2—CO$$

wherein R is a member selected from the group consisting of lower alkyl radicals containing from 1 to 7 carbon atoms, and phenyl radicals; X is a member selected from the group consisting of oxygen and sulfur; and $n$ is an integer of from 0 to 1, inclusive;
said bacterial cells functioning to link the 6-amino group of said 6-aminopenicillanic acid with said acyl radical;
adjusting the pH value to between 4.0 and 5.5;
incubating the resulting reaction mixture for at least two (2) hours;
and thereafter recovering the 6-acylaminopenicillanic acid from the reaction mixture;
said penicillin-splitting bacteria being selected from the group of bacteria capable of preferentially attacking the amide bond in the 6-position of a penicillin molecule with the formation of 6-aminopenicillanic acid as evidenced by the ability of said bacteria to inactivate penicillin G by at least 20 percent within 24 hours to yield a solution in which said inactivated penicillin G can be at least partially reactivated by the addition of phenylacetyl chloride thereto.

No references cited.